(12) United States Patent
Sakamoto

(10) Patent No.: US 8,335,645 B2
(45) Date of Patent: Dec. 18, 2012

(54) MAP DISPLAY SYSTEM, MAP DISPLAY, AND MAP DISPLAY METHOD

(75) Inventor: Hiroshi Sakamoto, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 428 days.

(21) Appl. No.: 12/593,150

(22) PCT Filed: Mar. 28, 2007

(86) PCT No.: PCT/JP2007/056550
§ 371 (c)(1),
(2), (4) Date: Mar. 19, 2010

(87) PCT Pub. No.: WO2008/120296
PCT Pub. Date: Oct. 9, 2008

(65) Prior Publication Data
US 2010/0168997 A1    Jul. 1, 2010

(51) Int. Cl.
*G01S 19/02* (2010.01)
(52) U.S. Cl. .......................... 701/440; 701/436
(58) Field of Classification Search .................. None
See application file for complete search history.

(56) References Cited

U.S. PATENT DOCUMENTS

| 4,914,605 | A | * | 4/1990 | Loughmiller et al. | ........ | 345/649 |
| 5,115,398 | A | * | 5/1992 | De Jong | .................... | 701/523 |
| 5,243,528 | A | * | 9/1993 | Lefebvre | .................... | 701/429 |
| 5,430,655 | A | * | 7/1995 | Adachi | ........................ | 701/428 |

(Continued)

FOREIGN PATENT DOCUMENTS
EP    1548406 A1    6/2005
(Continued)

OTHER PUBLICATIONS

Notification of Transmittal of Translation of the International Preliminary Report on Patentability (Form PCT/IB/338) of International Application No. PCT/JP2007/056550 mailed Oct. 29, 2009 with forms PCT/IB/373, PCT/ISA/237 and PCT/IB/326.

(Continued)

*Primary Examiner* — Joseph Rocca
*Assistant Examiner* — Nicole Verley
(74) *Attorney, Agent, or Firm* — Westerman, Hattori, Daniels & Adrian, LLP

(57) ABSTRACT

Navigation-related information such as a road name or guidance is allowed to be dynamically displayed along a road on a map displayed on the display screen and the road displayed on the display screen, its road name, and the moving direction are also allowed to be made easy visual identification. A map display system for displaying the road name or the navigation-related information together with the road on a display means according to map data including data on the road and data on the road name comprises a display area determining means, a display direction determining means for determining the direction in which the display of a text displayed on a road image moves, a road-name extracting means, and a text data display control means. The road-name extracting means extracts the road and its road name which are to be displayed from the road data to display the road image in the display area determined by the display area determining means. The text data display control means moves the road name on to the road image at predetermined intervals to display it according to the display direction determined by the display direction determining means.

21 Claims, 11 Drawing Sheets

U.S. PATENT DOCUMENTS

| | | | | |
|---|---|---|---|---|
| 5,519,819 | A * | 5/1996 | Nakayama | 345/648 |
| 5,559,938 | A * | 9/1996 | Van Roekel et al. | 345/441 |
| 5,684,940 | A * | 11/1997 | Freeman et al. | 345/630 |
| 5,893,045 | A * | 4/1999 | Kusama et al. | 701/428 |
| 6,067,502 | A * | 5/2000 | Hayashida et al. | 701/428 |
| 6,115,669 | A * | 9/2000 | Watanabe et al. | 701/428 |
| 6,356,840 | B2 * | 3/2002 | Kusama | 701/437 |
| 7,028,260 | B1 * | 4/2006 | Morsello | 715/210 |
| 7,106,218 | B2 * | 9/2006 | Kimura | 340/995.1 |
| 7,239,964 | B2 * | 7/2007 | Takizawa | 701/455 |
| 7,375,649 | B2 * | 5/2008 | Gueziec | 340/905 |
| 7,508,321 | B2 * | 3/2009 | Gueziec et al. | 340/905 |
| 7,630,832 | B2 * | 12/2009 | Kim et al. | 701/425 |
| 7,647,168 | B2 * | 1/2010 | Kikuchi et al. | 701/455 |
| 7,913,192 | B2 * | 3/2011 | Dicke et al. | 715/864 |
| 7,987,045 | B2 * | 7/2011 | Bowman et al. | 701/437 |
| 8,099,233 | B2 * | 1/2012 | Matsuno et al. | 340/995.1 |
| 2002/0112237 | A1 * | 8/2002 | Kelts | 725/39 |
| 2005/0143914 | A1 | 6/2005 | Yamada et al. | |
| 2007/0229538 | A1 * | 10/2007 | Klassen et al. | 345/629 |
| 2007/0256026 | A1 * | 11/2007 | Klassen et al. | 715/764 |
| 2009/0024319 | A1 * | 1/2009 | Tsuji | 701/209 |
| 2009/0150063 | A1 * | 6/2009 | Geelen | 701/201 |
| 2011/0300848 | A1 * | 12/2011 | Boudreau et al. | 455/419 |

FOREIGN PATENT DOCUMENTS

| | | |
|---|---|---|
| JP | 61-208086 A | 9/1986 |
| JP | 05-019687 A | 1/1993 |
| JP | 07-244719 A | 9/1995 |
| JP | 09-096540 A | 4/1997 |
| JP | 09-101747 A | 4/1997 |
| JP | 11-083518 A | 3/1999 |
| JP | 2000-029450 A | 1/2000 |
| JP | 2001-165681 A | 6/2001 |
| JP | 2002-297025 A | 10/2002 |
| JP | 2005-115174 A | 4/2005 |
| JP | 2005-189004 A | 7/2005 |
| JP | 2006-330112 A | 12/2006 |
| WO | 2005/036503 A1 | 4/2005 |

OTHER PUBLICATIONS

Korean Office Action dated Apr. 14, 2011, issued in corresponding Korean Patent Application No. 10-2009-7019990.

International Search Report for PCT/JP2007/056550, mailing date of Jun. 26, 2007.

* cited by examiner

| ROAD ID | NODE 1 | NODE 2 | · | · | NODE N |
|---|---|---|---|---|---|
| RD1 | x11·y11 | x12·y12 | | | x1n·y1n |
| RD2 | x21·y21 | x22·y22 | | | x2n·y2n |
| · | | | | | |
| · | | | | | |
| RDN | xn1·yn1 | xn2·yn2 | | | xnn·ynn |

Fig. 2

| ROAD ID | LINK 1 | LINK 2 | · | · | LINK N |
|---|---|---|---|---|---|
| RD 1 | LV11 | LV12 | | | LV1n |
| RD 2 | LV21 | LV22 | | | LV2n |
| · | | | | | |
| · | | | | | |
| RDN | LVn1 | LVn2 | | | LVnn |

Fig. 3

| ROAD ID | ROAD NAME |
|---------|-----------|
| RD1 | ABC St. |
| RD2 | GHI Way. |
| RD3 | DEF St. |
| . | |
| . | |
| RDN | **** Rd |

Fig. 4

MAP DISPLAY SYSTEM, MAP DISPLAY, AND MAP DISPLAY METHOD

TECHNICAL FIELD

The present invention relates to a map display system, a map display device, and a map display method for displaying a map in a navigation system or the like; and particularly relates to a map display system, a map display device, and a map display method wherein road names, guidance, and other navigation-related information can be dynamically displayed along roads on a map displayed on a display screen.

BACKGROUND ART

In the past there have been known navigation devices and navigation systems wherein a user is guided by using map data and road data to conduct a search for a route from a desired point of departure to a destination.

Examples of such navigation devices and navigation systems put into practice include car navigation systems for guiding an operator along a route, the system being installed in an automobile; communicable navigation systems wherein a portable phone is used as a navigation terminal, a route search request is sent to a route search server, the result is received, and route guidance is received; and the like.

The aforementioned car navigation systems uses a GPS (global positioning system), wherein GPS signals sent from a plurality of GPS satellites orbiting the globe are received by a GPS antenna; the satellite positions, time information, and the like included in the GPS signals are analyzed; and the position is specified. The number of the GPS satellites must be at least four. The independent positioning accuracy of a GPS is generally within 10 m, but this can be improved to 5 m or less by using a DGPS (differential GPS). Particularly, all models of portable phones referred to as third generation are tending to be equipped with positioning units that have presently only been installed in some portable phones, e.g., GPS receivers or the like which measure position by receiving signals from GPS (global positioning system) satellites.

A common navigation device, a route search device used in a communication navigation system, and a route search method are disclosed in Patent Reference 1 (Japanese Laid-open Patent Application No. 2001-165681) given below, for example. This navigation system is configured so that information on a point of departure and a destination is sent from a portable navigation terminal to a route search server, a road system and a traffic system are searched by the route search server for a route that matches the search conditions, and guidance is given. The search conditions include the means of moving from the point of departure to the destination, e.g., by foot, by automobile, a combination of by railroad and by foot, or the like; and this movement means is used as one search condition in the route search.

The route search server comprises roads (routes) of map data, wherein the positions of connecting points and turning points are nodes, the routes linking the nodes are links, and the cost information (distance and required time) of all the links is a database. The route search server can then guide the shortest route to the portable navigation terminal by referring to the database, sequentially searching for links beginning at the point of departure node and ending at the destination node, and creating a guiding route from the nodes and links having the minimal link cost information. A method known as label setting or the Dijkstra method is used as the method for this type of route search. A route search method which uses the Dijkstra method is also disclosed in Patent Reference 1.

Of all the routes from the point of departure to the destination obtained from a route search using road network data such as that described above, the route having the minimum cumulative route costs (distance or time) is determined to be the optimal guiding route, and guiding route data is created. In addition to the optimal route data, the guiding route data also includes map data and guidance data, and the guiding route data is read from a guiding data storing means and displayed on display means as necessary.

Generally, a guiding route and a mark indicating the current position of the navigation device are superposed on a map of a specified scale and a specified range including the current position of the navigation device, which has been positioned using the GPS receiver in the navigation device, and the current position mark is displayed so as to be in the center of the display image. In cases in which the navigation system has a voice guidance function, the guidance data is voice data, and guidance is given to the user by voice output.

The map data is sectioned into a mesh pattern with predetermined latitude and longitude ranges, and a map of a specific area is specified by mesh numbers. In a communicable navigation system, map data is distributed from the server to the terminal device, wherein the map data contains nine meshes adjacent to each other vertically, horizontally, and diagonally and centered around map data of a mesh including the current position of the terminal device. When the terminal device moves and the map data is insufficient, the terminal device sends a request to the server for a distribution of insufficient mesh map data. In an onboard navigation system, map data of the specified area is stored in advance on a hard disk device or the like.

When a map is displayed on the display means in this or another such navigation system, the road and its name are displayed in the vicinity of the corresponding road. For example, Patent Reference 2 (Japanese Laid-open Patent Application No. 2005-115174) given below discloses a map display device wherein the name of the corresponding road is displayed along the shape of the road.

The map display device disclosed in Patent Reference 2 is configured comprising a map display area determining unit, a road information acquiring unit, a map display data creating unit, and other components. The map display device determines an area for displaying the map, and the road information acquiring unit acquires turning point coordinate information and name information for the traffic route which is to be displayed in the determined display area from the map data sent from the map data distribution server. For every character or symbol constituting the character-symbol strings shown in the name information, the map display data creating unit determines a display position at a position that is located along the traffic route and that does not interfere with other characters and symbols, and the map display data creating unit creates map display data for displaying characters or symbols at the determined positions.

A typical electronic map used in a car navigation device or a map site on the Internet is generally configured from graphic components representing the terrain and character components for land names and the like. In the character components, road names are displayed in proximity to the roads, but in the case of raster maps, the display positions are often irrevocably determined. In vector maps, since the characters can also be depicted at arbitrary positions, the display positions are determined so that the road names can fit in the image.

For example, Patent Reference 3 (Japanese Laid-open Patent Application No. 9-101747) given below discloses an invention of a road map display device wherein specific positions in the display area of the road map (e.g., the area surrounding the display area) are set in advance as the road name display frame, the intersections between the road name display frame and the displayed roads are specified, and the road names are displayed at the intersections.

[Patent Reference 1]: Japanese Laid-open Patent Application No. 2001-165681 (FIGS. 1 and 2)
[Patent Reference 2]: Japanese Laid-open Patent Application No. 2005-115174 (FIGS. 1, 4, 6, and 16)
[Patent Reference 3]: Japanese Laid-open Patent Application No. 9-1011747 (FIGS. 2 and 4)

DISCLOSURE OF THE INVENTION

Problems the Invention is Intended to Solve

Roads are commonly positioned spanning across long sections of a map, and roads branch or intersect with other roads along the way. For such a road, even if the road name is depicted at a pre-established location in the display area as in the case of the road map display device disclosed in Patent Reference 3, a problem is encountered in that it is difficult to discern the road name at a location set apart from the position where the road name is displayed. The road to which the specific road name is assigned will also sometimes continue after turning to the right or left at an intersection point. In this case, if the road name is not displayed at an appropriate position, a problem is encountered in that the road of the corresponding name is easily mistaken as continuing straight forward.

Sometimes the road to which the name is assigned will have a starting point and an ending point, and different names will be assigned to the roads continuing from either end. When the display position of the road name is a position set apart from the corresponding road in such cases, a problem is encountered in that it is difficult to perceive the road name.

In the case of navigation systems, the maps, roads, and guiding routes displayed on the display screen are often moved while being visually confirmed. The displayed map image is scrolled along with the movement of the user. For road names and navigation-related displays; e.g., guidance text displays instructing the driver to go straight, turn right, turn left, or take other actions at guidance points, it is preferable that the display be dynamic rather than a display in which display positions are fixed, and the direction of progression of the road or of the user be intuitively perceivable.

The present invention is intended to resolve the problems described above, and as a result of various studies, it was found that the problems described above could be resolved and the present invention could be completed if road names, guidance, and other navigation-related information can be dynamically displayed along roads on a map displayed on a display screen.

Specifically, the present invention is intended to resolve the problems described above, it being an object thereof to provide a map display system, a map display device, and a map display method wherein road names, guidance, and other navigation-related information can be dynamically displayed along roads on a map displayed on a display screen; and the roads, their road names, and the directions of progression displayed on the display screen can be easily visually identified.

Means for Solving the Abovementioned Problems

In order to overcome the aforesaid drawbacks, a first mode of a map display system according to a first aspect of the present invention is:

a map display system for displaying a road name or navigation-related information together with the road on display means on the basis of map data including road data and road name data; the map display system characterized in that:

the map display system comprises display area determining means, display direction determining means for determining the direction in which the display of text displayed on a road image moves, road-name extracting means, and text data display control means; and the road-name extraction means extracts from the road data the road and the road name to be displayed and displays the road image in the display area determined by the display area determining means, and the text data display control means moves the road name along the road image at predetermined display intervals to display the road name according to the display direction determined by the display direction determining means.

A second mode of the map display system according to the first aspect of the present invention is:

a map display system for displaying a road name or navigation-related information together with the road on display means on the basis of map data including road data and road name data; the map display system characterized in that:

the map display system comprises display area determining means, display direction determining means for determining the direction in which the display of text displayed on the road image moves, navigation-related information editing means, road-name extracting means, and text data display control means; and the road-name extraction means extracts from the road data the road to be displayed and displays the road image in the display area determined by the display area determining means, the navigation-related information editing means edits navigation-related information displayed together with the road image as text data, and the text data display control means moves the text data edited by the navigation-related information editing means along the road image at predetermined display intervals to display the text data according to the display direction determined by the display direction determining means.

A third mode of the map display system according to the first aspect of the present invention is the first or second mode of the first aspect, characterized in that the display direction determining means determines the direction in which the road name or the text data edited by the navigation-related information editing means is displayed and moved to be the same direction as the direction of progression of the road.

A fourth mode of the map display system according to the first aspect of the present invention is the first mode of the first aspect, characterized in that in cases in which a starting point or ending point of the road to which the road name is associated is located within the display area, the text data display control means displays the road name so that the road name appears or terminates at the starting point.

A fifth mode of the map display system according to the first aspect of the embodiment of the present invention is the first mode of the first aspect, characterized in that in cases in which the road to which the road name is associated branches and the branching point is located within the display area, the text data display control means branches the road image branching from the branching point and moves and displays the road image at predetermined display intervals.

A sixth mode of the map display system according to the first aspect of the embodiment of the present invention is the first mode of the first aspect, characterized in that the map display system further comprises road traffic information acquiring means for acquiring traffic congestion information, wherein, when the road name is moved and displayed at predetermined display intervals along the road image, the predetermined display intervals are varied according to the traffic congestion information acquired by the road traffic information acquiring means.

A seventh mode of the map display system according to the first aspect of the embodiment of the present invention is the first mode of the first aspect, characterized in that the map data includes data and names of rivers, sea routes, and other linear natural landscape data; images of the natural landscapes are displayed in the display area determined by the display area determining means; and the text data display control means moves and displays the names at predetermined display intervals along the images of the natural landscapes.

A first mode of a map display device according to a second aspect of the present invention is:

a map display device for acquiring map data including road data and road name data from a map distribution server, and displaying the road name or navigation-related information together with the road on display means on the basis of the map data; the map display device characterized in that:

the map display device comprises display area determining means, display direction determining means for determining the direction in which the display of text displayed on the road image moves, road-name extracting means, and text data display control means; and the road-name extraction means extracts the road and the road name which are to be displayed from the road data and displays the road image in the display area determined by the display area determining means, and the text data display control means moves the road name along the road image at predetermined display intervals to display the road name according to the display direction determined by the display direction determining means.

A second mode of a map display device according to a second aspect of the present invention is:

a map display device for acquiring map data including road data and road name data from a map distribution server, and displaying the road name or navigation-related information together with the road on display means on the basis of the map data; the map display device characterized in that:

the map display device comprises display area determining means, display direction determining means for determining the direction in which the display of text displayed on the road image moves, navigation-related information editing means, road-name extracting means, and text data display control means; and the road-name extraction means extracts from the road data the road to be displayed and displays the road image in the display area determined by the display area determining means, the navigation-related information editing means edits navigation-related information displayed together with the road image as text data, and the text data display control means moves the text data edited by the navigation-related information editing means along the road image at predetermined display intervals to display the text data according to the display direction determined by the display direction determining means.

A third mode of the map display device according to the second aspect of the present invention is the first or second mode of the second aspect, characterized in that the display direction determining means determines the direction in which the road name or the text data edited by the navigation-related information editing means is displayed and moved to be the same direction as the direction of progression of the road.

A fourth mode of the map display device according to the second aspect of the present invention is the first mode of the second aspect, characterized in that in cases in which a starting point or ending point of the road to which the road name is associated is located within the display area, the text data display control means displays the road name so that the road name appears or terminates at the starting point.

A fifth mode of the map display device according to the second aspect of the present invention is the first mode of the second aspect, characterized in that in cases in which the road to which the road name is associated branches and the branching point is located within the display area, the text data display control means branches the road image branching from the branching point and moves and displays the road image at predetermined display intervals.

A sixth mode of the map display device according to the second aspect of the present invention is the first mode of the second aspect, characterized in that the map distribution server or the map display device further comprises road traffic information acquiring means for acquiring traffic congestion information, wherein, when the road name is moved and displayed at predetermined display intervals along the road image, the predetermined display intervals are varied according to the traffic congestion information acquired by the road traffic information acquiring means.

A seventh mode of the map display device according to the second aspect of the present invention is the first mode of the second aspect, characterized in that the map data includes data and names of rivers, sea routes, and other linear natural landscape data; images of the natural landscapes are displayed in the display area determined by the display area determining means; and the text data display control means moves and displays the names at predetermined display intervals along the images of the natural landscapes.

A first mode of a map display method according to a third aspect of the present invention is:

a map display method in a map display system for displaying a road name or navigation-related information together with the road on display means on the basis of map data including road data and road name data; the map display method characterized in that:

the map display system comprises display area determining means, display direction determining means for determining the direction in which the display of text displayed on the road image moves, road-name extracting means, and text data display control means; and the map display method has a step wherein the road-name extraction means extracts from the road data the road and the road name to be displayed and displays the road image in the display area determined by the display area determining means, and a step wherein the text data display control means moves the road name along the road image at predetermined display intervals to display the road name according to the display direction determined by the display direction determining means.

A second mode of the map display method according to the third aspect of the present invention is:

a map display method in a map display system for displaying a road name or navigation-related information together with the road on display means on the basis of map data including road data and road name data; the map display method characterized in that:

the map display system comprises display area determining means, display direction determining means for determining the direction in which the display of text displayed on the road image moves, navigation-related information editing means, road-name extracting means, and text data display control means; and the map display method has a step wherein the road-name extraction means extracts from the road data the road to be displayed and displays the road image in the display area determined by the display area determining means, a step wherein the navigation-related information editing means edits navigation-related information displayed together with the road image as text data, and a step wherein the text data display control means moves the text data edited by the navigation-related information editing means along the road image at predetermined display intervals to display the text data according to the display direction determined by the display direction determining means.

A third mode of the map display method according to the third aspect of the present invention is the first or second mode of the third aspect, characterized in having a step wherein the display direction determining means determines the direction in which the road name or the text data edited by the navigation-related information editing means is displayed and moved to be the same direction as the direction of progression of the road.

A fourth mode of the map display method according to the third aspect of the present invention is the first mode of the third aspect, characterized in having a step wherein, in cases in which a starting point or ending point of the road to which the road name is associated is located within the display area, the text data display control means displays the road name so that the road name appears or terminates at the starting point.

A fifth mode of the map display method according to the third aspect of the present invention is the first mode of the third aspect, characterized in having a step wherein the text data display control means branches the road image branching from a branching point and moves and displays the road image at predetermined display intervals in cases in which the road to which the road name is associated branches and the branching point is located within the display area.

A sixth mode of the map display method according to the third aspect of the present invention is the first mode of the third aspect, characterized in that the map display system further comprises road traffic information acquiring means for acquiring traffic congestion information, and the map display method has a step for varying said predetermined display intervals according to the traffic congestion information acquired by said road traffic information acquiring means when the road name is moved and displayed at predetermined display intervals along said road image.

A seventh mode of the map display method according to the third aspect of the present invention is the first mode of the third aspect, characterized in that the map data includes data and names of rivers, sea routes, and other linear natural landscape data; and the map display method has a step for displaying images of the natural landscapes in the display area determined by the display area determining means, and a step wherein the text data display control means moves and displays the names at predetermined display intervals along the images of the natural landscapes.

Effect of the Invention

In the map display system, the map display device, and the map display method according to the first through third aspects of the present invention, road names, guidance, and other navigation-related information can be dynamically displayed along roads on a map displayed on a display screen; and the roads, their road names, and the directions of progression displayed on the display screen can be easily visually identified.

According to the sixth modes in the map display system, the map display device, and the map display method according to the first through third aspects of the present invention, since the movement speed of the display is varied according to the movement speed of the map display device, the amount of traffic congestion on the road being traveled can be expressed by the movement speed of the road name display, and the amount of traffic congestion on the road can be easily visually identified according to this type of display.

BRIEF DESCRIPTION OF THE DRAWINGS

FIG. 2 is a diagram showing the configuration of road data, which is a primary element of the map data;

FIG. 3 is a diagram showing the link data in the road data of FIG. 2;

FIG. 4 is a diagram showing road name data;

KEY TO SYMBOLS

Figure 1:
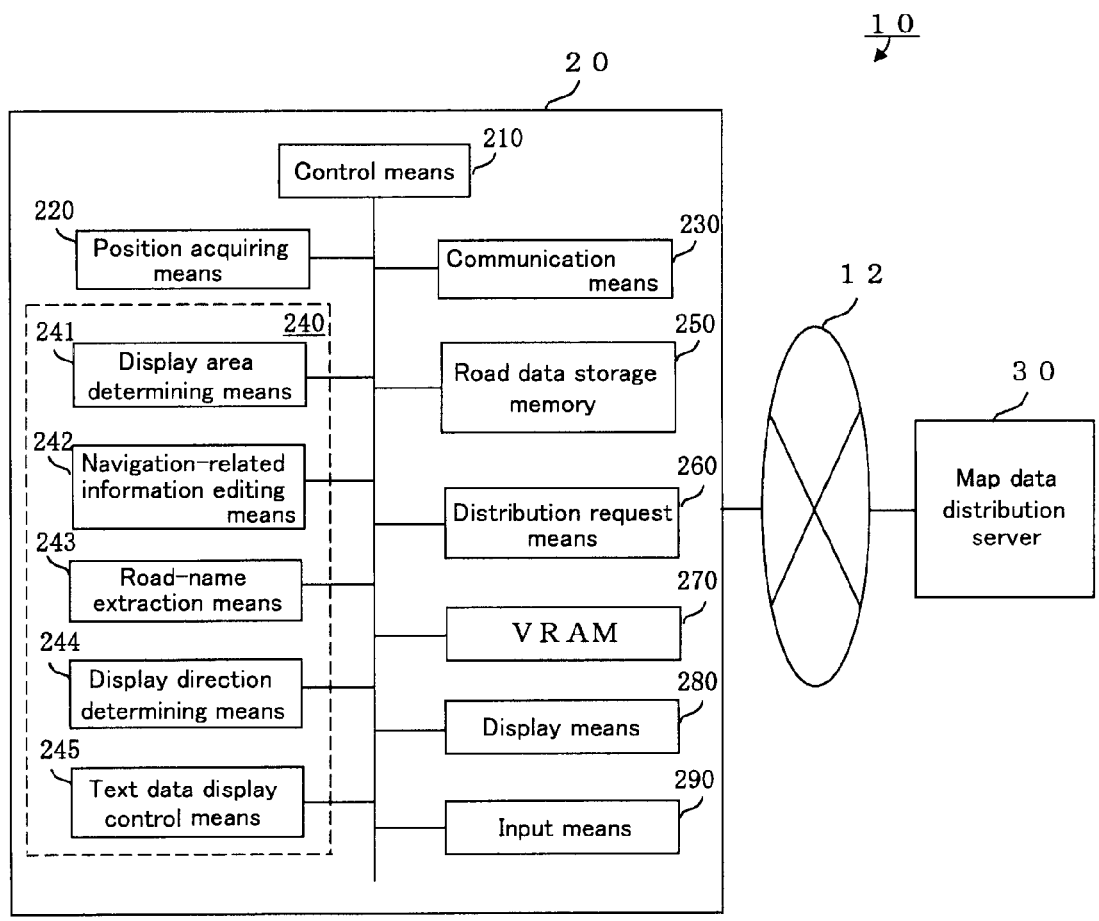
FIG. 1 is a block diagram showing the configuration of a map display system including a map display device according to an example of the present invention.

10 Map display system
12 Network
20 Map display device
30 Map data distribution server
210 Control means
220 Position acquiring means
230 Communication means
240 Road display control means
241 Display area determining means
242 Navigation-related information editing means
243 Road-name extraction means
244 Display direction determining means
245 Text data display control means
250 Road data storage memory
260 Distribution request means
270 VRAM
280 Display means
290 Input means

BEST MODE FOR CARRYING OUT THE INVENTION

Specific embodiments of the present invention are described in detail below with reference to examples and the accompanying drawings. The examples shown hereinbelow are intended to illustrate a map display system and a map display device for specifying the technical ideals of the present invention. The present invention is not intended to be specified as a map display system or a map display device, and can be similarly applied to the other embodiments of map display systems and map display devices included in the claims.

FIG. 1 is a block diagram showing the configuration of a map display system 10 including a map display device 20 according to an example of the present invention. The map display device 20 according to this example of the present invention is connected to a map data distribution server 30 via a network 12, constituting the communicable map display system 10 as shown in FIG. 1. The map data distribution server 30 may also be a route search server which not only distributes map data to the map display device 20, but also has a navigation function.

The map display device 20 may also be an on-board navigation terminal or a portable terminal such as a portable phone comprising a navigation application for receiving navigation service. The map displayed on the map display device 20 includes roads, road names, points of intersection and other nodes, node names, landmarks on the map and their names, and other information; however, in the present example, only roads and road names are described as targets representing the map.

The present invention can be applied to a wide variety of electronic map display devices. Raster map data in which geographical names and road names are converted to a dot matrix format is not a target, and it is essential that characters can be displayed at arbitrary positions and angles.

The map display device 20 is configured comprising control means 210; position acquiring means 220; communication means 230; road display control means 240 configured from display area determining means 241, navigation-related information editing means 242, road-name extraction means 243, display direction determining means 244, text data display control means 245, and other means; road data storage memory 250; distribution request means 260; VRAM 270; display means 280; input means 290; and other components.

The control means 210 is a microprocessor having RAM, ROM, and a processor (not shown); and the control means controls the actions of the components by a control program stored in the ROM. The communication means 230 is used to communicate with the map data distribution server 30 and various other servers via the network 12.

The input means 290 is composed of alphanumeric keys, other functional keys, selection keys, scroll keys, and the like; and is used to operate the map display device 20 and perform the necessary input. The input means is also used to select the desired menu from a menu screen displayed on the display means 280, which is output means; or to operate the keys and perform various input operations. Therefore, the display means 280 functions as part of the input means 290.

The position acquiring means 220 is configured including satellite navigation means for receiving a GPS satellite signal and measuring the current position of the map display device 20 by latitude and longitude. In the case that the map display device 20 is an on-board device, the map display device comprises autonomous navigation means configured from an acceleration sensor, a steering sensor, and the like; and the current position is acquired by the autonomous navigation means in areas where GPS position measurement is nonfunctional.

The distribution request means 260 is used to distribute the necessary road data to the map data distribution server 30, and in cases in which a navigation function is included, the conditions for the route search specified by the input means 290 are sent to the map data distribution server 30, and the map data distribution server 30 searches for a route according to these conditions and distributes a guiding route and map data to the map display device 20. The road data storage memory 250 is storage means for storing the road data distributed from the map data distribution server 30, and in cases in which a navigation function is included, the road data storage memory also stores guiding route data, landmarks on the map, and other data distributed from the map data distribution server 30.

The VRAM 270 is a memory unit for depicting image data displayed on the display means 280. The road display control means 240 is a processor for performing the road and road name displays according to the present invention. The road data, which is a primary element of the map data, is configured from links connecting the nodes, the nodes being intersecting points, curving points, and the like. FIG. 2 is a diagram showing the configuration of road data. The roads are each assigned a road ID as identification information, and the roads are each displayed by a node 1 through node N for intersection points, curving points, and the like, as shown in FIG. 2. The positions of the nodes are expressed as x and y coordinates using latitude and longitude. For example, road RD1 is expressed as node 1 (x11, y11) through node N (x1$n$, y1$n$).

The data of links connecting the nodes of the roads together is generally configured by storing link costs showing the lengths and required times of the links and vectors representing link orientation and size for each link, as shown in FIG. 3. For example, link 1 of road RD1 is a link connecting node 1 and node 2, and in this link are stored the distance between the nodes and vector data LV11 showing the orientation and size of link 1. The same applies to the other links 2 through N.

For the road data and road names, the names of the roads are stored corresponding to the road IDs as shown in FIG. 4. The data shown in FIGS. 2 through 4 is retained as road data in the map data distribution server 30, and road data in the required range is distributed from the map data distribution server 30 in accordance with a distribution request from the map display device 20. The distributed road data is stored in the road data storage memory 250.

In the present invention, the display of map images and characters (text) is divided into display layers to create a combined display. In cases in which a map is displayed, the display area of the map displayed on the display screen of the display means 280 is determined as being centered around the current position, and the road-name extraction means 243 extracts the road and road name which are to be displayed from the road data. The display direction determining means 244 then determines the direction in which the display of text data showing the road name moves. This movement direction is the same direction as the traffic on the corresponding road. The text data display control means 245 moves and displays the road name as text on the road in accordance with the display movement direction determined by the display direction determining means 244.

In cases in which an end point of a road is located on the map display, the text data display control means 245 controls the display so that the road name appears or terminates at the end point. Furthermore, in cases in which the same road branches, the display is controlled so that the display and movement of the road name is displayed and moved as being branched. The speed at which the road name display moves can also be varied according to the movement speed of the map display device. In this case, the amount of traffic congestion on the road being traveled can be expressed by the movement speed of the road name display.

Figure 5:
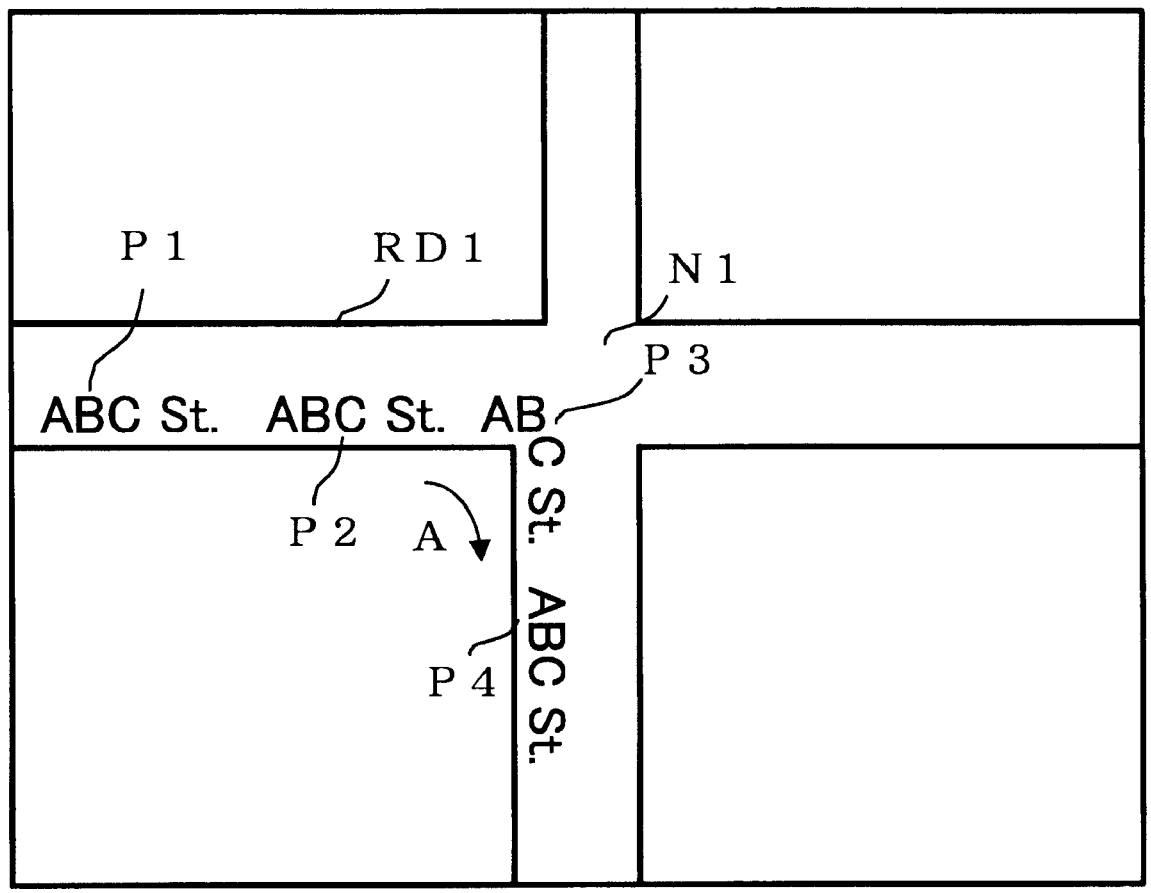
FIG. 5 is a drawing showing an example of a road image and a display image of the road name according to the present invention.

FIG. 5 is a drawing showing an example of a road image (map image) and a display image of the road name according to the present invention. In the map display according to the present invention, the road name is displayed while being moved along the road as shown in FIG. 5. In FIG. 5, road RD1 denoted by the road name "ABC St." turns at the intersection point node N1, which in a normal road name display is a location where the road could be easily mistaken as continuing straight.

For this type of road RD1, the road name "ABC St." is displayed on the image of road RD1 while the sequential display positions are moved as shown by P1 to P4. Since road RD1 turns to the right at the node N1 (intersection point), the display position of the road name "ABC St." is also moved as shown by arrow A along the direction in which road RD1 progresses.

Figure 6:
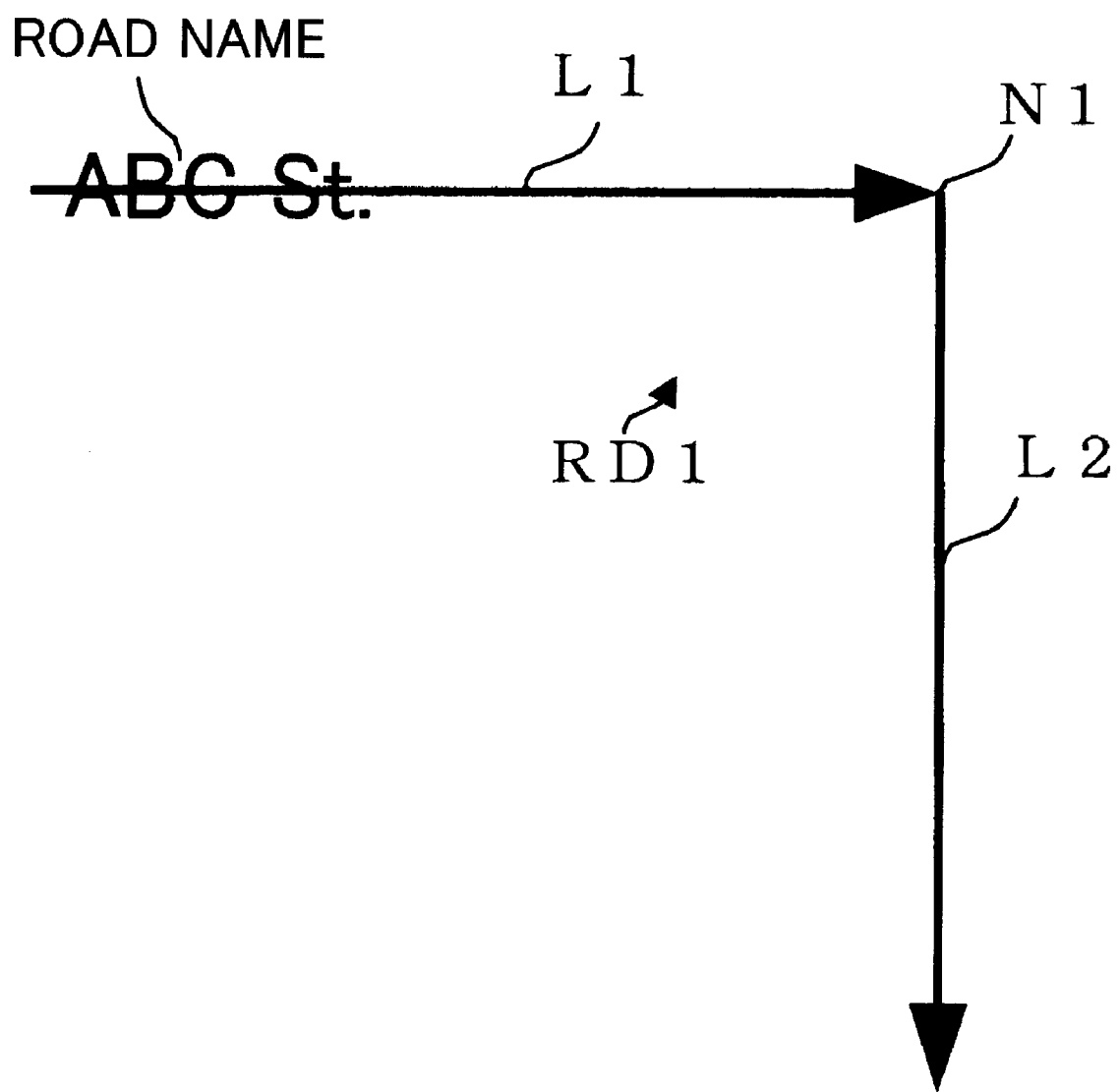
FIG. 6 is a schematic view showing a summary of the method for displaying the links and road name "ABC St." of road RD1 shown in FIG. 5.

This type of display position of the road name can be moved by following the links of road RD1. FIG. 6 is a schematic view showing a summary of the method for displaying the links and road name "ABC St." of road RD1 shown in FIG. 5. Road RD1 turns to the right (downward in the display image) at node N1 of the intersection point, as shown by link L1, node N1, and link L2 in FIG. 6. In this case, the name is depicted along the links from upstream of the directed links L1, L2, . . . of road RD1, the name is temporarily not depicted at the final end of link L1 (or the turning point), and the name then continues to be depicted along the next link L2. Thus, even if the target road RD1 turns at node N1 of the intersection point, the road name is continuously moved and displayed along the direction in which the road progresses.

Because the road name is thus depicted along the directed links of the road network data, the movement direction of the road name depiction in a one-way road is the same direction as that allowed by the one-way regulation, and it is possible to express that the road is a one-way road because a road name moving in the opposite direction cannot be displayed. If the road is a two-way road, the display will include a moving display of a road name which turns back at the ends of the display screen, or road name displays which start from both directions of the road.

Figure 7:
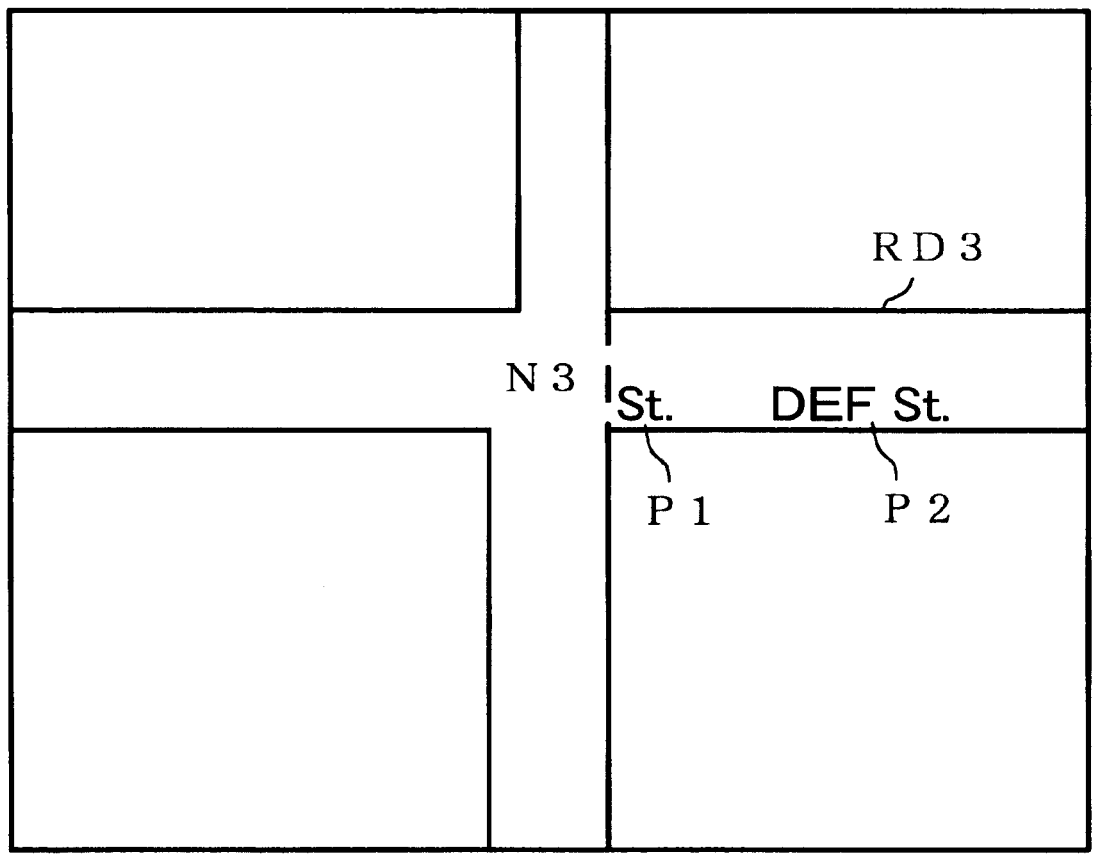
FIG. 7 is a drawing showing an example of a road image and a road name display image at the starting point of a road to which a road name is associated.

In cases in which an end point of a road is located on the map display, the text data display control means 245 controls the display so that the road name appears or terminates at the end point. FIG. 7 is a drawing showing an example of a road image and a road name display image at the starting point of a road to which a road name is associated. In a case in which a road RD3 denoted by a road name "DEF St." starts from a node N3 (the starting point of "DEF St." is node N3) as shown in FIG. 7, the text of the road name "DEF St." begins at node N3 and is displayed while moving successively as shown by display P1 and display P2. If the road name is thus displayed from the starting point of the road, it is easy to recognize node N3 as being the starting point of the road. Conversely, the display at the ending point of the road is such that the display of the road name terminates at the ending point. The ending point of the road can thereby be easily recognized.

Figure 8:
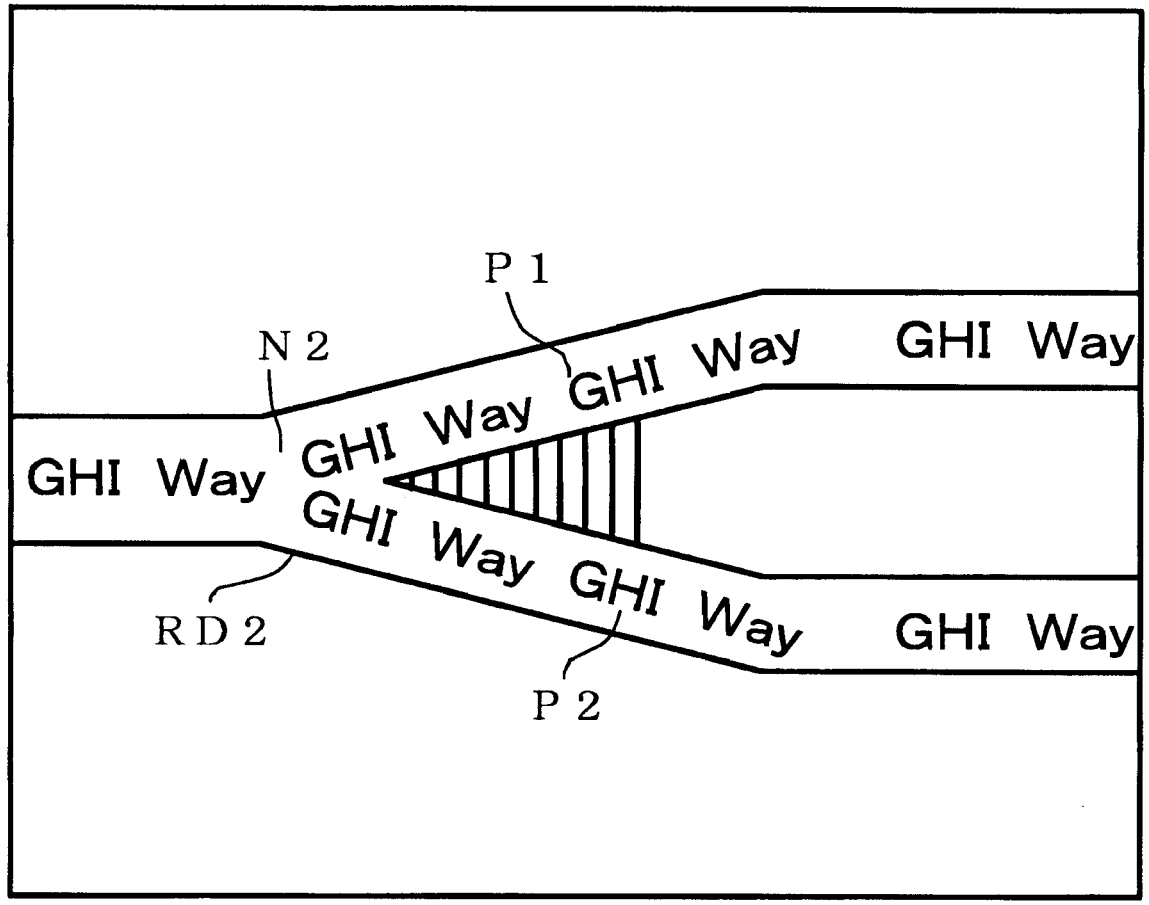
FIG. 8 is a drawing showing an example of a road image and a road name display image in a case in which a road branches with the same road name.

In a case in which one road splits into a left course and a right course due to branching, since the road names themselves are the same, the road name display also branches and is displayed while moving. FIG. 8 shows an example of this type of road display. In FIG. 8, a road RD2 branches vertically at a node N2. In cases in which the road name is the same without changing at node N1, the same road name is displayed as shown by displays P1, P2.

The movement speed of the road name display can also be varied according to the movement speed of the map display device. In this case, the amount of traffic congestion on the road being traveled can be expressed by the movement speed of the road name display. Specifically, the movement amount D of the road name display is varied according to the movement amount (movement speed) of the map display device 20, i.e., a movement amount based on the traffic conditions on the road.

Figure 9:
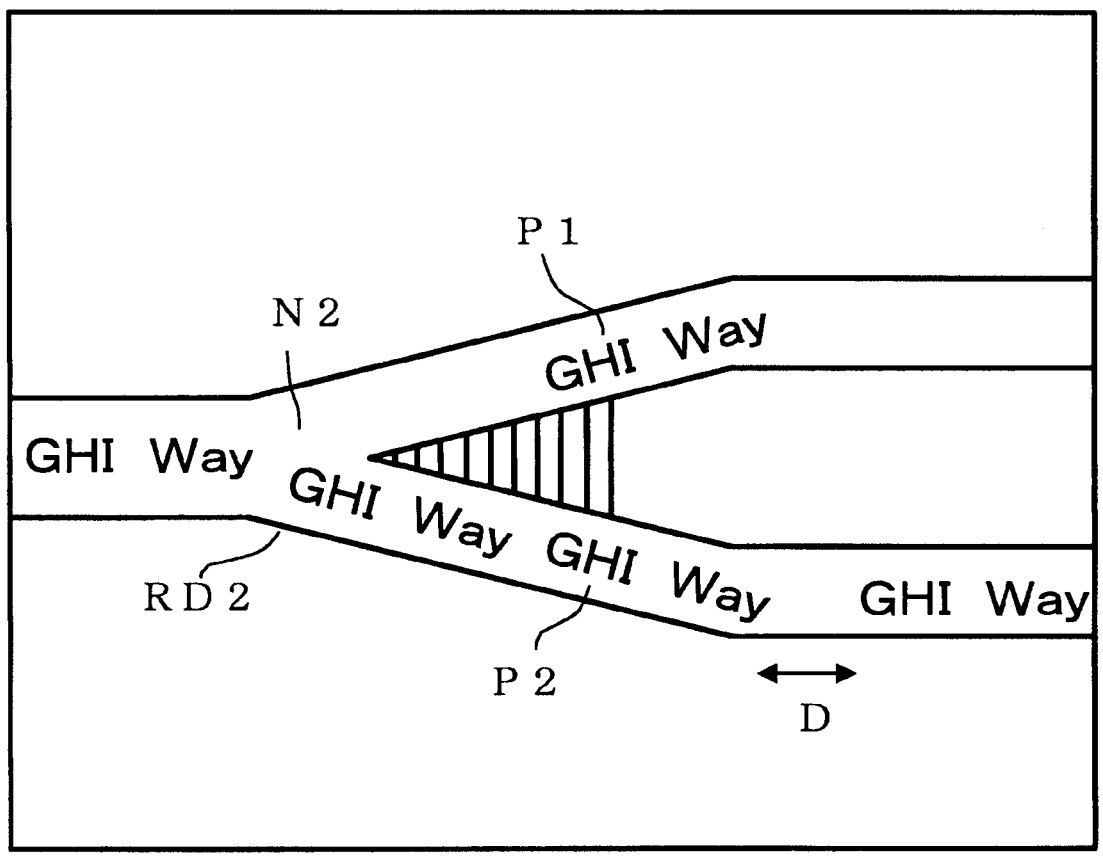
FIG. 9 is a drawing showing another example of a road image and a road name display image in a case in which a road branches with the same road name.

FIG. 9 is a drawing showing an example of a road image and a road name display image corresponding to the traffic conditions on a road. In FIG. 9, the movement amount D (display intervals) of the road name can be expressed as an actual range equivalent by the formula:

$$D = a \cdot V \cdot T$$

In this formula, a represents a coefficient for the display, V represents the road speed (road traffic information: based on traffic congestion information), and T represents the time of depicted intervals.

If the display is made in this manner, the movement of the display name is also slowed in cases in which the road has traffic congestion, and the traffic congestion can be expressed. In the display image example of FIG. 9, it is possible to perceive that the road on the left route (the upper route in the display image) after the branching has comparatively fast traffic.

The examples of display images shown in FIGS. 5 through 9 are expressions for the sake of description, and the road names may be shown as moving in smaller increments so as to move more smoothly.

The above description used displays of road images and road names as examples, but the display method according to the present invention can be applied to the display of navigation-related information as well. For example, this method can be applied when guidance at intersection nodes and the like is displayed as text in an optimal guiding route obtained by a route search.

Marks indicating the guiding route and the current position of the navigation device are superimposed on a map of a specified scale and specified range including the current position of the navigation device measured using the GPS receiver of the navigation device or the map display device as previously described, and the current position marks are displayed so as to be in the center of the display image. In cases in which the navigation device has a voice guidance function, the guidance data for guiding right turns and left turns at intersection points and the like is voice data, and the user is guided by voice output.

However, when guided by voice guidance alone, the user might miss the guidance. For such instances, if text data corresponding to the voice guidance data is prepared and the text data is displayed along the guiding route, the direction of progression (guiding direction) at the intersection points can be easily distinguished.

Figure 10:
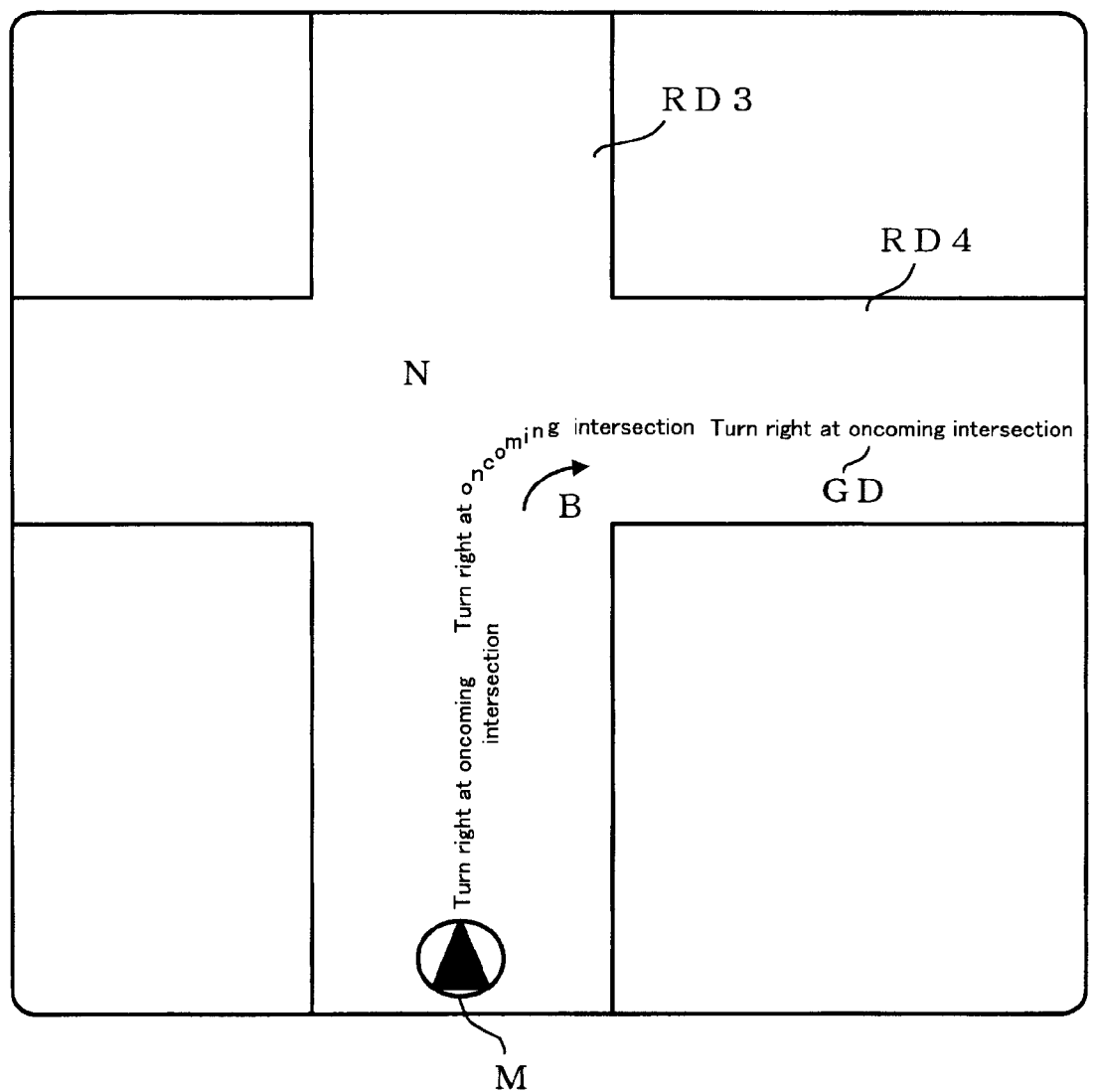
FIG. 10 is a drawing showing an example of a display image in a case in which guidance data is displayed along a guiding route.

FIG. 10 is a drawing showing a display image example in which text data corresponding to the voice guidance is displayed along the guiding route. In FIG. 10, the letter M is a current position mark showing the current position of the map display device 20. The guiding route progresses through a road RD3 to a node N (intersection point) and turns right at node N onto a road RD4. The specifics of the guidance at this time are to guide the user to "turn right at the upcoming intersection." If the display method of the present invention is applied, the text data GD shown in FIG. 10 is displayed while being moved as shown by arrow B along the road image, which is the guiding route.

The guidance data and other navigation-related information is thus edited as text data and is displayed while moving the data along the guiding route, whereby the user can easily distinguish the guiding route and the direction of progression from the image.

In cases in which the map data distribution server 30 has road network data and a route search means for route searching and the map display device 20 has route search and route guidance functions, the route search is performed as follows, and the optimal route data is sent to the map display device 20.

The route network data for route searching is configured as follows. For example, in a case in which the road is composed of roads A, B, and C as shown in FIG. 11, the end points, intersection points, turning points, and other features of roads A, B, and C are represented as nodes; the roads linking the nodes together are represented as directed links; and the route network data is configured from the node data (latitude and longitude of the nodes), the link data (link numbers), and the link cost data obtained by converting link costs of the links (the distance of the links or the required time needed to travel the links) into data.

Figure 11:
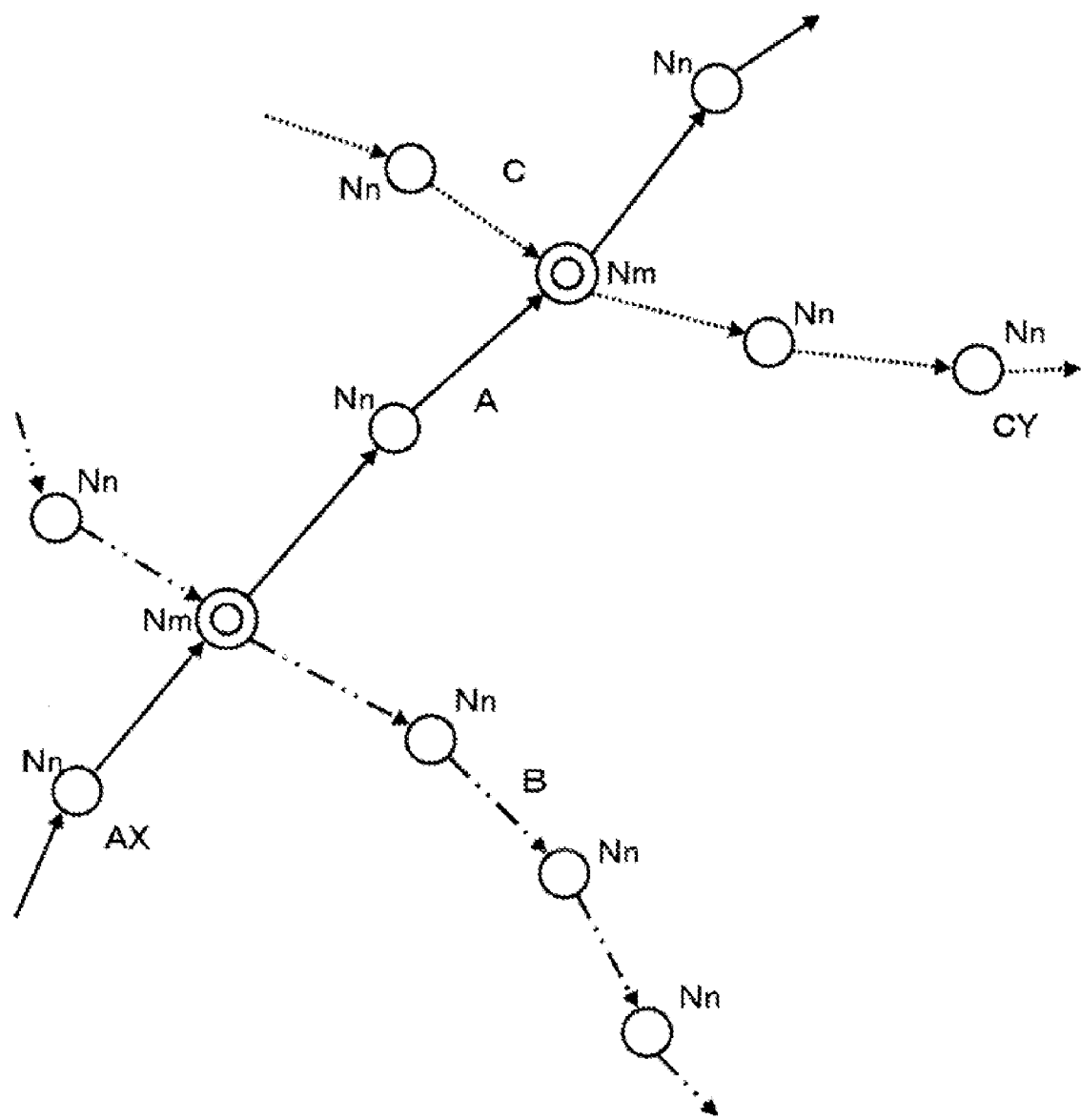
FIG. 11 is a conceptual drawing for describing the configuration of road network data for route searching.

Specifically, in FIG. 11, Nn (the symbol ◯) and Nm (the symbol ⊚) indicate nodes, and Nm (the symbol ⊚) indicates an intersecting point between roads. The directed links which connect the links together are represented by arrow lines (solid lines, dotted lines, and double-dotted lines). The links include links pointed in various upward and downward inclined directions of the roads, but only links of arrows having orientations are shown herein for the sake of simplifying the drawing in FIG. 11.

In cases in which a route search is performed using this type of road network data as a data base for route searching, links connecting the node of the point of departure to the node of the destination are mapped out, the link costs are accumulated, a search is conducted for the route in which the cumulative link cost is minimal, and guidance is given. Specifically, in a case in which a route search is performed wherein the point of departure is node AX and the destination is node CY in FIG. 11; links are sequentially mapped out wherein the user travels road A from node AX, makes a right turn at the second intersection point, enters road C, and reaches node CY; the link costs are accumulated; a search is conducted for a route in which the cumulative value of the link costs is minimal; and guidance is given.

In FIG. 11, no other routes from node AX to node CY are shown, but since other such routes really do exist, a search is similarly conducted for a plurality of routes whereby node CY can be reached from node AX, and from these routes a route whereby link costs are minimal is determined as the optimal route. The method used to accomplish this is a conventionally known method known as the Dijkstra method, for example.

INDUSTRIAL APPLICABILITY

The present invention can also be used in name displays pertaining to railroad routes, rivers, sea routes, and other linear landscape features. For example, subways are often depicted on the map as dashed lines or thin lines and are difficult to make out. It is difficult to find route names, and it is also difficult to discern the route name even if the subway station is found. There are a plurality of routes at a transfer station, which is even more difficult to discern. In such cases, if the route names are moved and displayed along the routes, the necessary information can be perceived very clearly.

The invention claimed is:

1. A map display system for displaying a road name or navigation-related information together with the road on a display on the basis of map data including road data and road name data; the map display system comprising:
   a processor configured to operate as
       a display area determiner to determine a display area;
       a display direction determiner for determining the direction in which the display of a text displayed on a road image moves;
       a road-name extracter to extract the road and road name to be displayed from the road data, and to display the road image in the display area determined by the display area determiner; and
       a text data display controller to move the road name along the road image at predetermined display intervals to display the road name according to the display direction determined by the display direction determiner.

2. A map display system for displaying a road name or navigation-related information together with the road on display on the basis of map data including road data and road name data; the map display system comprising:
   a processor configured to operate as
       a display area determine a display area;
       a display direction determiner for determining the direction in which the display of text displayed on the road image moves;
       a navigation-related information editer to edit navigation-related information displayed together with said road image as text data;
       a road-name extracter to extract from the road data the road to be displayed and displays the road image in the display area determined by said display area determiner; and
       a text data display controller to move the text data edited by the navigation-related information editer along the road image at predetermined display intervals to display the text data according to the display direction determined by said display direction determiner.

3. The map display system according to claim 1, wherein in cases in which a starting point or ending point of the road to which said road name is associated is located within the display area, said text data display controller displays said road name so that the road name appears or terminates at said starting point.

4. The map display system according to claim 1, wherein in cases in which the road to which said road name is associated branches and said branching point is located within the display area, said text data display controller branches the road image branching from said branching point and moves and displays the road image at predetermined display intervals.

5. The map display system according to claim 1, wherein said processor of said map display system is further configured to operate as a road traffic information acquirer to acquire traffic congestion information, wherein, when the road name is moved and displayed at predetermined display intervals along said road image, said predetermined display intervals are varied according to the traffic congestion information acquired by said road traffic information acquirer.

6. The map display system according to claim 1, wherein said map data includes data and names of rivers, sea routes, and other linear natural landscape data; images of said natural landscapes are displayed in the display area determined by said display area determiner; and said text data display controller moves and displays said names at predetermined display intervals along the images of said natural landscapes.

7. The map display system according to claim 2, wherein the display direction determiner determines the direction in which said road name or the text data edited by said navigation-related information editor is displayed and moved to be the same direction as the direction of progression of said road.

8. A map display device for acquiring map data including road data and road name data from a map distribution server, and displaying the road name or navigation-related information together with the road on a display on the basis of said map data; said map display device comprising:
   a processor configured to operate as
      a display area determiner to determine a display area;
      a display direction determiner to determine the direction in which the display of text displayed on the road image moves;
      a road-name extracter to extract the road and the road name which are to be displayed from the road data and to display the road image in the display area determined by said display area determiner; and
      a text data display controller to move the road name along the road image at predetermined display intervals to display the road name according to the display direction determined by said display direction determiner.

9. The map display device according to claim 8, wherein in cases in which a starting point or ending point of the road to which said road name is associated is located within the display area, said text data display controller displays said road name so that the road name appears or terminates at said starting point.

10. The map display device according to claim 8, wherein in cases in which the road to which said road name is associated branches and the branching point is located within the display area, said text data display controller branches the road image branching from said branching point and moves and displays the road image at predetermined display intervals.

11. The map display device according to claim 8, wherein said processor of said map distribution server or said map display device further comprises a road traffic information acquirer to acquire traffic congestion information, wherein, when the road name is moved and displayed at predetermined display intervals along said road image, said predetermined display intervals are varied according to the traffic congestion information acquired by said road traffic information acquirer.

12. The map display device according to claim 8, wherein said map data includes data and names of rivers, sea routes, and other linear natural landscape data; images of said natural landscapes are displayed in the display area determined by said display area determiner; and said text data display controller moves and displays said names at predetermined display intervals along the images of said natural landscapes.

13. A map display device for acquiring map data including road data and road name data from a map distribution server, and displaying the road name or navigation-related information together with the road on a display on the basis of said map data; said map display device comprising:
   a processor configured to operate as
      a display area determiner to determine a display area;
      a display direction determiner to determine the direction in which the display of a text displayed on the road image moves;
      a navigation-related information editor to edit navigation-related information displayed together with said road image as text data;
      a road-name extracter to extract from the road data the road to be displayed and to display the road image in the display area determined by said display area determiner; and
      a text data display controller to move the text data edited by the navigation-related information editor along the road image at predetermined display intervals to display the text data according to the display direction determined by said display direction determiner.

14. The map display device according to claim 13, wherein the display direction determiner determines the direction in which said road name or the text data edited by said navigation-related information editor is displayed and moved to be the same direction as the direction of progression of said road.

15. A map display method in a map display system for displaying a road name or navigation-related information together with the road on display on the basis of map data including road data and road name data;
   the map display system comprising a display area determiner, a display direction determiner to determine the direction in which the display of text displayed on the road image moves, a road-name extracter, and a text data display controller; and
   the map display method comprises a step wherein said road-name extracter extracts from the road data the road and the road name to be displayed and displays the road image in the display area determined by said display area determiner, and a step wherein said text data display controller moves the road name along the road image at predetermined display intervals to display the road name according to the display direction determined by said display direction determiner.

16. The map display method according to claim 15, further comprising a step wherein, in cases in which a starting point or ending point of the road to which said road name is associated is located within the display area, said text data display controller displays said road name so that the road name appears or terminates at said starting point.

17. The map display method according to claim 15, further comprising a step wherein, in cases in which the road to which said road name is associated branches and said branching point is located within the display area, said text data display controller branches the road image branching from said branching point and moves and displays the road image at predetermined display intervals.

18. The map display method according to claim 15, wherein said map display system further comprises a road traffic information acquirer to acquire traffic congestion information, and the map display method further comprises a step for varying said predetermined display intervals according to the traffic congestion information acquired by said road traffic information acquirer when the road name is moved and displayed at predetermined display intervals along said road image.

19. The map display method according to claim 15, wherein said map data includes data and names of rivers, sea routes, and other linear natural landscape data; and the map display method further comprises a step for displaying images of said natural landscapes in the display area determined by said display area determiner, and a step wherein said text data display controller moves and displays said names at predetermined display intervals along the images of said natural landscapes.

20. A map display method in a map display system for displaying a road name or navigation-related information together with the road on display means on the basis of map data including road data and road name data;

the map display system comprises a display area determiner, a display direction determiner to determine the direction in which the display of text displayed on the road image moves, a navigation-related information editer, a road-name extracter, and a text data display controller; and the map display method comprises a step wherein said road-name extracter extracts from the road data the road to be displayed and displays the road image in the display area determined by said display area determiner, a step wherein said navigation-related information editer edits navigation-related information displayed together with said road image as text data, and a step wherein said text data display controller moves the text data edited by the navigation-related information editer along the road image at predetermined display intervals to display the text data according to the display direction determined by said display direction determiner.

21. The map display method according to claim 20, further comprising a step wherein the display direction determiner determines the direction in which said road name or the text data edited by said navigation-related information editer is displayed and moved to be the same direction as the direction of progression of said road.

* * * * *